(12) United States Patent
Han et al.

(10) Patent No.: US 11,840,448 B2
(45) Date of Patent: Dec. 12, 2023

(54) METHOD FOR THE PREPARATION OF AMMONIA SYNTHESIS GAS

(71) Applicant: Haldor Topsøe A/S, Kgs. Lyngby (DK)

(72) Inventors: Pat A. Han, Smørum (DK); Annette E. Krøll Jensen, Fredensborg (DK)

(73) Assignee: Topsoe A/S, Kgs. Lyngby (DK)

( * ) Notice: Subject to any disclaimer, the term of this patent is extended or adjusted under 35 U.S.C. 154(b) by 744 days.

(21) Appl. No.: 16/622,044

(22) PCT Filed: Jul. 11, 2018

(86) PCT No.: PCT/EP2018/068808
§ 371 (c)(1),
(2) Date: Dec. 12, 2019

(87) PCT Pub. No.: WO2019/020378
PCT Pub. Date: Jan. 31, 2019

(65) Prior Publication Data
US 2020/0172394 A1 Jun. 4, 2020

(30) Foreign Application Priority Data

Jul. 25, 2017 (DK) .......................... PA 2017 00425
Sep. 25, 2017 (DK) .......................... PA 2017 00522
May 28, 2018 (DK) .......................... PA 2018 00237

(51) Int. Cl.
*C01B 3/02* (2006.01)
*C01B 3/38* (2006.01)
(Continued)

(52) U.S. Cl.
CPC .............. *C01B 3/025* (2013.01); *C01B 3/382* (2013.01); *C01B 3/384* (2013.01); *C01C 1/0405* (2013.01); *C25B 1/04* (2013.01); *C01B 2203/0233* (2013.01); *C01B 2203/0244* (2013.01); *C01B 2203/0283* (2013.01); *C01B 2203/046* (2013.01); *C01B 2203/0445* (2013.01);
(Continued)

(58) Field of Classification Search
CPC ......... C01B 3/025; C01B 3/382; C01B 3/384; C01B 2203/0233; C01B 2203/0244; C01B 2203/0283; C01B 2203/0445; C01B 2203/046; C01B 2203/0475; C01B 2203/1235; C01C 1/0405; C25B 1/04
USPC ....................................................... 423/359
See application file for complete search history.

(56) References Cited

U.S. PATENT DOCUMENTS

| 4,479,925 A | 10/1984 | Shires et al. |
| 4,792,441 A | 12/1988 | Wang et al. |

(Continued)

FOREIGN PATENT DOCUMENTS

| CN | 101892492 A | 11/2010 |
| EP | 0 999 178 A1 | 5/2000 |

(Continued)

OTHER PUBLICATIONS

K.H. Kaggerud et al., "Chemical and Process Integration: Synergies in Co-Production of Power and Chemicals from Natural Gas with $CO_2$ Capture." Applied Thermal Engineering, vol. 26, pp. 1345-1352 (2006).

*Primary Examiner* — Douglas B Call
(74) *Attorney, Agent, or Firm* — BLANK ROME LLP

(57) ABSTRACT

Method for the preparation of ammonia synthesis gas based on a combination of autothermal reforming and electrolysis of water.

7 Claims, 1 Drawing Sheet

(51) Int. Cl.
  *C01C 1/04* (2006.01)
  *C25B 1/04* (2021.01)
(52) U.S. Cl.
  CPC ............... *C01B 2203/0475* (2013.01); *C01B 2203/1235* (2013.01)

(56) References Cited

U.S. PATENT DOCUMENTS

| | | | |
|---|---|---|---|
| 6,011,073 A * | 1/2000 | Agee | C01B 3/38 422/255 |
| 10,889,496 B2 | 1/2021 | Aasberg-Petersen et al. | |
| 11,053,130 B2 | 7/2021 | Han | |
| 11,124,424 B2 | 9/2021 | Han | |
| 2003/0065042 A1 | 4/2003 | Shaw | |
| 2004/0028595 A1 | 2/2004 | Davey et al. | |
| 2004/0063798 A1 | 4/2004 | Erikstrup et al. | |
| 2004/0182002 A1 | 9/2004 | Malhotra et al. | |
| 2005/0234278 A1 | 10/2005 | van Egmond et al. | |
| 2007/0256360 A1 | 11/2007 | Kindig et al. | |
| 2007/0299144 A1 | 12/2007 | Davey et al. | |
| 2009/0165459 A1 | 7/2009 | Henriksen et al. | |
| 2009/0314994 A1 | 12/2009 | Filippi et al. | |
| 2010/0076097 A1 | 3/2010 | Metz et al. | |
| 2012/0091730 A1 | 4/2012 | Stuermer et al. | |
| 2012/0100062 A1 | 4/2012 | Nakamura et al. | |
| 2013/0072583 A1 | 3/2013 | Koskinen et al. | |
| 2013/0252299 A1 | 9/2013 | Bell et al. | |
| 2013/0345325 A1 | 12/2013 | Lecomte et al. | |
| 2014/0323597 A1 | 10/2014 | Stuckert et al. | |
| 2014/0357736 A1 | 12/2014 | Dahl | |
| 2015/0014596 A1 * | 1/2015 | Filippi | C01B 3/025 252/376 |
| 2015/0203359 A1 * | 7/2015 | Nataraj | C01B 13/0251 422/148 |
| 2016/0083260 A1 * | 3/2016 | Dahl | C07C 273/10 423/359 |
| 2016/0115405 A1 | 4/2016 | Zubrin et al. | |
| 2017/0002281 A1 | 1/2017 | Aasberg-Petersen et al. | |
| 2020/0109051 A1 | 4/2020 | Aasberg-Petersen et al. | |
| 2020/0131034 A1 | 4/2020 | Aasberg-Petersen et al. | |

FOREIGN PATENT DOCUMENTS

| | | |
|---|---|---|
| EP | 2 166 064 A1 | 3/2010 |
| EP | 2 192 082 A1 | 6/2010 |
| EP | 2 589 574 A1 | 5/2013 |
| EP | 2 676 924 A1 | 12/2013 |
| EP | 2 805 914 B1 | 9/2017 |
| GB | 2 545 474 A | 6/2017 |
| KR | 10-2005-0075628 A | 7/2005 |
| WO | WO 2007/049069 A1 | 5/2007 |
| WO | WO 2010/008494 A1 | 1/2010 |
| WO | WO 2011/088981 A1 | 7/2011 |
| WO | WO 2012/084135 A1 | 6/2012 |
| WO | WO-2015/067436 A1 | 5/2015 |
| WO | WO 2015/128456 A1 | 9/2015 |
| WO | WO 2016/008820 A1 | 1/2016 |
| WO | WO 2016/149507 A1 | 9/2016 |

* cited by examiner

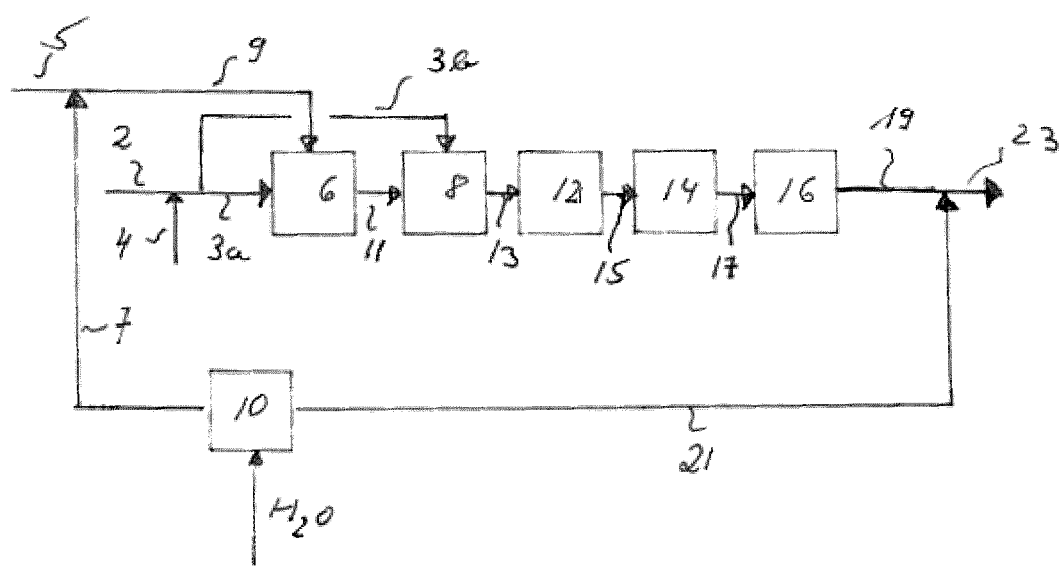

METHOD FOR THE PREPARATION OF AMMONIA SYNTHESIS GAS

The present invention is directed to the preparation of ammonia synthesis gas. More particular, the invention combines electrolysis of water and autothermal reforming of a gaseous hydrocarbon feed stock in the preparation of a hydrogen and nitrogen containing ammonia synthesis gas.

Ammonia synthesis gas is conventionally prepared by subjecting hydrocarbon feed of natural gas or higher hydrocarbons to endothermic steam reforming reactions in a fired tubular steam reformer by contact with a steam reforming catalyst. The primary reformed gas is then fed into a secondary adiabatic reformer, wherein part of hydrogen and residual amounts of hydrocarbons in the gas are partial oxidized with air or oxygen enriched air in presence of a secondary reforming catalyst. From the secondary reformer, raw synthesis gas containing hydrogen, nitrogen, carbon monoxide and carbon dioxide formed during reaction of the feedstock in the above steam reforming reactions and nitrogen introduced into the gas through addition of air in the secondary reforming step.

The disadvantage of the primary and secondary reforming process is a relatively high fuel consumption for use in heating the fired primary steam reformer and consequently large $CO_2$ emission. The $CO_2$ product being captured from the process can be used for downstream processes such as urea production or enhanced oil recovery.

The primary and secondary steam reforming can in large scale ammonia synthesis plant be replaced by autothermal reforming (ATR).

ATR comprises partial oxidation using oxygen in a reaction with natural gas to CO, $CO_2$, $H_2$, $H_2O$ and hydrocarbon and subsequently steam reforming of the hydrocarbon to form raw synthesis gas. With ATR technology, the specific hydrocarbon consumption can be reduced slightly as well as the $CO_2$ emission.

In the conventional ATR process, an Air Separation Unit (ASU) supplies oxygen for the ATR and nitrogen for the ammonia synthesis as well.

Less than half of the nitrogen being processed in the ASU will be used for the ammonia synthesis because the ATR demands relatively more oxygen than nitrogen than the ratio between oxygen and nitrogen in atmospheric air. Excess nitrogen can be considered as energy loss from the ASU.

Recently, a combination of electrolysis of water for production of hydrogen and air separation for the production of nitrogen has been envisaged for the preparation of ammonia synthesis gas, at least in patent literature. The thus produced hydrogen and nitrogen are combined in stoichiometric ratios to form synthesis gas for ammonia production. The problem with the combination of electrolysis and air separation is, however, that oxygen is produced as by-product in both electrolysis and air separation, which has no use in the ammonia synthesis, and can be considered as energy losses.

The present invention is based on a combination of the ATR process using oxygen from the electrolysis of water in the partial oxidation of hydrocarbon feed stock in the ATR process. Hydrogen from the electrolysis can be used to adjust the hydrogen/nitrogen molar ratio in the ammonia synthesis gas approximately to the stoichiometric ratio required for the production of ammonia, as well as additional synthesis gas production.

Compared to prior art methods using electrolysis of water for hydrogen production and air separation for nitrogen production, the oxygen product from electrolysis of water is advantageously used for partial oxidation in the autothermal reformer so that the costly and energy intensive ASU is avoided in the method according to the invention.

Thus, this invention is a method for the preparation of ammonia synthesis gas comprising the steps of
(a) providing a hydrocarbon feed stock;
(b) preparing a separate hydrogen stream and a separate oxygen stream by electrolysis of water;
(c) providing process air for use in autothermal reforming by enriching atmospheric air with the oxygen stream from step (b);
(d) autothermal reforming at least a part of the hydrocarbon feed stock with the oxygen enriched process air to a process gas stream comprising hydrogen, nitrogen, carbon monoxide and carbon dioxide;
(e) treating the process gas stream withdrawn from the autothermal reforming step (d) in one or more water gas shift reactions;
(f) removing the carbon dioxide from the water gas shift treated process gas stream; and
(g) purifying the process gas stream from step (f); and
(h) obtaining the ammonia synthesis gas.

The process gas stream leaves the autothermal reforming step at high temperature of between 950 and 1100° C. The high temperature of the process gas can advantageously be utilized in steam reforming of a part of the hydrocarbon feed stock in a heat exchange reformer. In one type of such a process, the hydrocarbon feed stock is split in two substreams, where one of the substreams is introduced into autothermal reforming step and the other substream is introduced into the heat exchange reformer and is steam reformed by indirect heat transfer with the hot process stream leaving the autothermal reforming step. The steam reformed process gas from the heat exchange reforming is mixed with the process gas stream from the autothermal reforming prior to the mixed process gas stream is treated in the water gas shift reactions.

Thus, in an embodiment of the invention, the method comprises the further step of steam reforming a part of the hydrocarbon feed stock in indirect heat transfer relationship with the process stream leaving the autothermal reforming step (d) and mixing the heat exchange steam reformed process gas stream with autothermal reformed process gas stream upstream step (e).

In another type of such a process, heat exchange steam reforming is performed in series with the autothermal reforming step. In the serial heat exchange steam reforming process, all the hydrocarbon feedstock is passed through the heat exchange reformer where it is heated and partially converted. The partially converted feedstock is then fed to the autothermal reformer where the final conversion takes place. The hot process stream from the autothermal reformer is passed through heat exchange reformer in indirect heat exchanging relationship with the hydrocarbon feedstock and provides the necessary heat for the endothermic steam reforming reaction.

Thus in another embodiment of the invention, the method comprises the further step of heat exchange steam reforming the hydrocarbon feed stock in indirect heat transfer relationship with the process stream leaving the autothermal reforming step (d) and passing the heat exchanged steam reformed hydrocarbon feed stock to step (d).

The nitrogen in the ammonia synthesis gas stems from atmospheric air being introduced into the ATR process. Because the ATR demands relatively more oxygen than nitrogen than the molar ratio between oxygen and nitrogen in atmospheric air, the atmospheric air used in the method according to the invention is enriched with oxygen from the water electrolysis to provide process air with an oxygen content of between 22 and 45 mole %, preferably 37 mole %, where a low methane slippage can be obtained from the ATR.

The molar ratio of hydrogen to nitrogen in ammonia synthesis gas is required to be between 2.7-3.3. The required molar ratio is typically obtained by adjusting the amount of process air introduced into the autothermal reforming process.

Another method or a supplemental method of adjusting the hydrogen to nitrogen molar ratio in the ammonia synthesis gas is introducing the hydrogen stream obtained in the water electrolysis into the purified process gas.

The hydrogen stream will then be introduced into the purified process gas preferably near the suction of a synthesis gas compressor for the ammonia loop.

Thus, in an embodiment of the invention, at least a part of the hydrogen stream obtained in step (b) is added to process gas stream subsequently to step (g) in an amount to provide a molar ratio of the hydrogen to the nitrogen of 2.7-3.3 in the ammonia synthesis gas.

When using the hydrogen stream from the water electrolysis for adjustment of the ammonia synthesis gas, the water electrolysis is preferably performed at increased pressure corresponding to the pressure of the process gas, which saves compression energy.

Purification of the process gas obtained in the autothermal reforming step and optionally in the heat exchange steam reforming step is preferably performed by subjecting the process gas to one or more water gas shift reactions of CO to $CO_2$ for more hydrogen production and $CO_2$ removal with a chemically and/or physically absorption of the $CO_2$ as known in the art.

When an ASU is not included in the ammonia synthesis gas preparation, liquid nitrogen is not available for the removal of impurities from the process gas by a liquid nitrogen wash and use liquid nitrogen in the purifying step is less feasible.

The nitrogen wash in the purifying step can preferably replaced by methanation in the method according to the invention to remove traces of carbon oxides in the process gas.

The purifying step can also be based on cryogenic methods, like the so called coldbox process, which also can be used for adjustment of the $N_2/H_2$ molar ratio by removing excess of $N_2$.

The method according to the invention is to a great extent based on water electrolysis because both products of the electrolysis are employed in the method.

The advantage of the invention is then that energy for operating the water electrolysis can be renewable energy generated by windmills, solar cells, hydraulic energy or other renewables.

Thus, in a preferred embodiment of the invention, the electrolysis of water is powered by renewable energy.

The method of the invention can also advantageously be utilized in revamping and/or increasing production capacity of an existing ATR based ammonia synthesis gas plant.

One of the major advantages of the method according to the invention is a considerably increased efficiency of the electrolysis unit by nearly 30%, compared to the efficiency in the prior art processes employing solely electrolysis and air separation, without ATR or secondary reforming.

Reported efficiencies of commercialized technologies for water electrolysis are between 40% to 60%. The efficiency of water electrolysis is defined as the Lower Heating Value (LHV) of hydrogen produced divided by the electrical power consumed. No energy value is given to oxygen produced since it has no thermodynamic heating value.

The synergy in combining water electrolysis combined with ATR or secondary reforming technology for ammonia synthesis gas production, results in overall savings of hydrocarbon feedstock and fuel for the partial oxidation process and power requirement for an ASU since an ASU is absent in the inventive process.

In Table 1 below, key figures are given for a 2200 MTPD ammonia plant for comparison of syngas technologies for ATR with ASU and ATR combined with water electrolysis without ASU.

TABLE 1

| Technology for syngas | Natural gas consumption, $Nm^3/h$ | ASU power consumption, MW | Power for electrolysis, MW | $CO_2$ footprint, $Nm^3/h$ |
|---|---|---|---|---|
| Conventional | 74,528 | 0 | 0 | 91,075 |
| ATR with ASU | 65,506 | 30.3 | 0 | 79,700 |
| ATR & water electrolysis | 53,819 | 0 | 205.7 | 65,953 |

Compared to the process using ATR and ASU, the process according to the invention, when utilizing 205.7 MW power for water electrolysis with an efficiency of 60%, the saving of natural gas is 129 MW (LHV=39771 $KJ/Nm^3$) and 30.3 MW power for the ASU. The overall efficiency of the water electrolysis has then increased from 60% to 77.4%. That is nearly an increase of 30%. Moreover, the Capital expenditures for an ASU has been saved. Since the natural gas consumption is decreased by 22% and the $CO_2$ emission is reduced correspondingly.

A specific embodiment of the invention is disclosed in more detail by reference to the drawings, in which FIG. 1 is a simplified flow diagram of the method according to the invention for the preparation of ammonia synthesis gas utilizing water electrolysis combined with ATR and heat exchange steam reforming.

In the simplified block diagram as shown in FIG. 1, the method is performed by autothermal reforming a stream 2 of a hydrocarbon feedstock, e.g. natural gas (NG) admixed with a stream of steam 4 in autothermal reformer (ATR) 6 and heat exchange reformer (HTER) 8. A part of stream 2 is bypassed ATR 6 in stream 3b and introduced into HTER 8.

ATR 6 is operated with oxygen enriched air. Oxygen for the enrichment of air is produced by water electrolysis in water electrolyzer (WE) 10 and a stream of oxygen 7 produced in WE 10, is admixed into air 5 in amount to produce process air 9 with an oxygen content of 37 mole %. In ATR 6 a part of natural gas 4 is introduced in stream 3a and autothermal reformed by the known autothermal reforming process. Hot autothermal reformed effluent 11 being withdrawn from ATR 6 at a temperature of about 1000° C. is passed through HTER 8 in indirect heat exchange with the natural gas provided to HTER 8 in line 3b and provides heat for the steam reforming reactions in HTER 8. The total amount of steam reformed and autothermal reformed process gas stream 13 containing hydrogen, nitrogen, carbon monoxide and carbon dioxide is passed to water gas shift (WGS) unit 12 and most of the carbon oxides in stream 13 is converted by the known WGS reactions to carbon dioxide.

Carbon dioxide formed by the WGS reactions and by the steam reforming reactions is removed from the water gas shift treated process gas stream 15 in gas-liquid contactor 14 by absorption in N-methyldiethanolamine (MDEA), as known in the art.

The final purification of the process gas stream 17 withdrawn from gas-liquid contactor 14 is performed by methanation of residual amounts of carbon monoxide in methanator 16 by reaction of carbon monoxide to methane.

The nitrogen/hydrogen molar ratio in the purified process gas stream 19 from methanator 16 is adjusted to about 3 by introducing the appropriate amount of hydrogen formed in WE 10 through stream 21 into stream 19.

The thus prepared ammonia synthesis gas is the passed through line 23 to a make up gas compressor (not shown) and fed into the ammonia synthesis loop (not shown).

The invention claimed is:

1. Method for the preparation of ammonia synthesis gas comprising the steps of:
   (a) providing a hydrocarbon feed stock;
   (b) preparing a separate hydrogen stream and a separate oxygen stream by electrolysis of water;
   (c) providing process air for use in autothermal reforming by enriching atmospheric air with the oxygen stream from step (b);
   (d) autothermal reforming at least a part of the hydrocarbon feed stock with the oxygen enriched process air to a process gas stream comprising hydrogen, nitrogen, carbon monoxide and carbon dioxide;
   (e) treating the process gas stream obtained in the autothermal reforming step (d) in one or more water gas shift reactions;
   (f) removing the carbon dioxide from the water gas shift treated process gas stream;
   (g) purifying the process gas stream from step (f); and
   (h) obtaining the ammonia synthesis gas, wherein at least a part of the hydrogen stream obtained from the electrolysis of water in step (b) is added to the process gas stream after step (g) in an amount to provide a molar ratio of the hydrogen to the nitrogen of 2.7-3.3 in the ammonia synthesis gas, and wherein the electrolysis of water in step (b) is performed at an increased pressure relative to the pressure of the process gas stream.

2. The method of claim 1, comprising the further step of steam reforming a part of the hydrocarbon feed stock in indirect heat transfer relationship with the process stream leaving the autothermal reforming step (d) to obtain a heat exchange steam reformed gas stream, and mixing the heat exchange steam reformed process gas stream with autothermal reformed process gas stream upstream step (e).

3. The method of claim 1, comprising the further step of heat exchange steam reforming the hydrocarbon feed stock in indirect heat transfer relationship with the process stream leaving the autothermal reforming step (d) and passing the heat exchanged steam reformed hydrocarbon feed stock to step (d).

4. The method of claim 1, wherein the process air contains between 22 and 45 mole% oxygen.

5. The method according to claim 1, wherein the purifying of the process gas stream in step (f) is performed by methanation.

6. The method according to claim 1, wherein the purifying of the process gas stream in step (f) is performed cryogenic.

7. The method according to claim 1, wherein the electrolysis of water is powered by renewable energy.

* * * * *